United States Patent [19]
Elliott et al.

[11] Patent Number: 5,805,487
[45] Date of Patent: Sep. 8, 1998

[54] METHOD AND SYSTEM FOR FAST DETERMINATION OF STICKY AND GUARD BITS

[75] Inventors: Timothy Alan Elliott; Christopher Hans Olson; Michael Putrino, all of Austin, Tex.

[73] Assignee: International Business Machines Corporation, Armonk, N.Y.

[21] Appl. No.: 677,843

[22] Filed: Jul. 12, 1996

[51] Int. Cl.⁶ .................................................. G06F 7/48
[52] U.S. Cl. ................. 364/748.05; 364/748.02
[58] Field of Search .................. 364/748.05, 748.03, 364/748.02, 715.04

[56] References Cited

U.S. PATENT DOCUMENTS

| | | | |
|---|---|---|---|
| 5,341,319 | 8/1994 | Madden et al. | 364/748.05 |
| 5,432,727 | 7/1995 | Ahmed | 364/748.05 |
| 5,627,774 | 5/1997 | Schwarz et al. | 364/715.04 |
| 5,694,350 | 12/1997 | Wolrich et al. | 364/748.05 |

*Primary Examiner*—David H. Malzahn
*Attorney, Agent, or Firm*—Sawyer & Associates; Casimer K. Salys

[57] ABSTRACT

A method and system for fast calculation of the sticky bit and a function of the guard bit is disclosed. A first aspect of the method and system provides a fast calculation of the sticky bit. A second aspect provides a fast calculation of a function of the guard bit. Both aspects comprise means for providing an intermediate result of a floating point mathematical operation involving at least a first and a second operand and means for providing a mask indicating a position of a leading one in a mantissa of the intermediate result. In the first aspect, means for aligning a first bit of the mask to an (n+2)nd bit of the intermediate result, where n is the number of bits in a mantissa of the first or second operand, are coupled to the intermediate result providing means. In the second aspect, means for aligning a first bit of the mask to an (n+1)st bit of the intermediate result are coupled to the intermediate result providing means. In both aspects, means for providing an output are coupled to the aligning means and intermediate result providing means. The output of the first aspect comprises the sticky bit. The output of the second aspect comprises a function of the guard bit. Thus, the method and system allow the sticky bit and a function of the guard bit to be calculated substantially simultaneously with normalization. Because the method and system allow fast determination of the sticky bit and a function of the guard bit, the overall speed of the calculation is increased and system performance is improved.

39 Claims, 3 Drawing Sheets

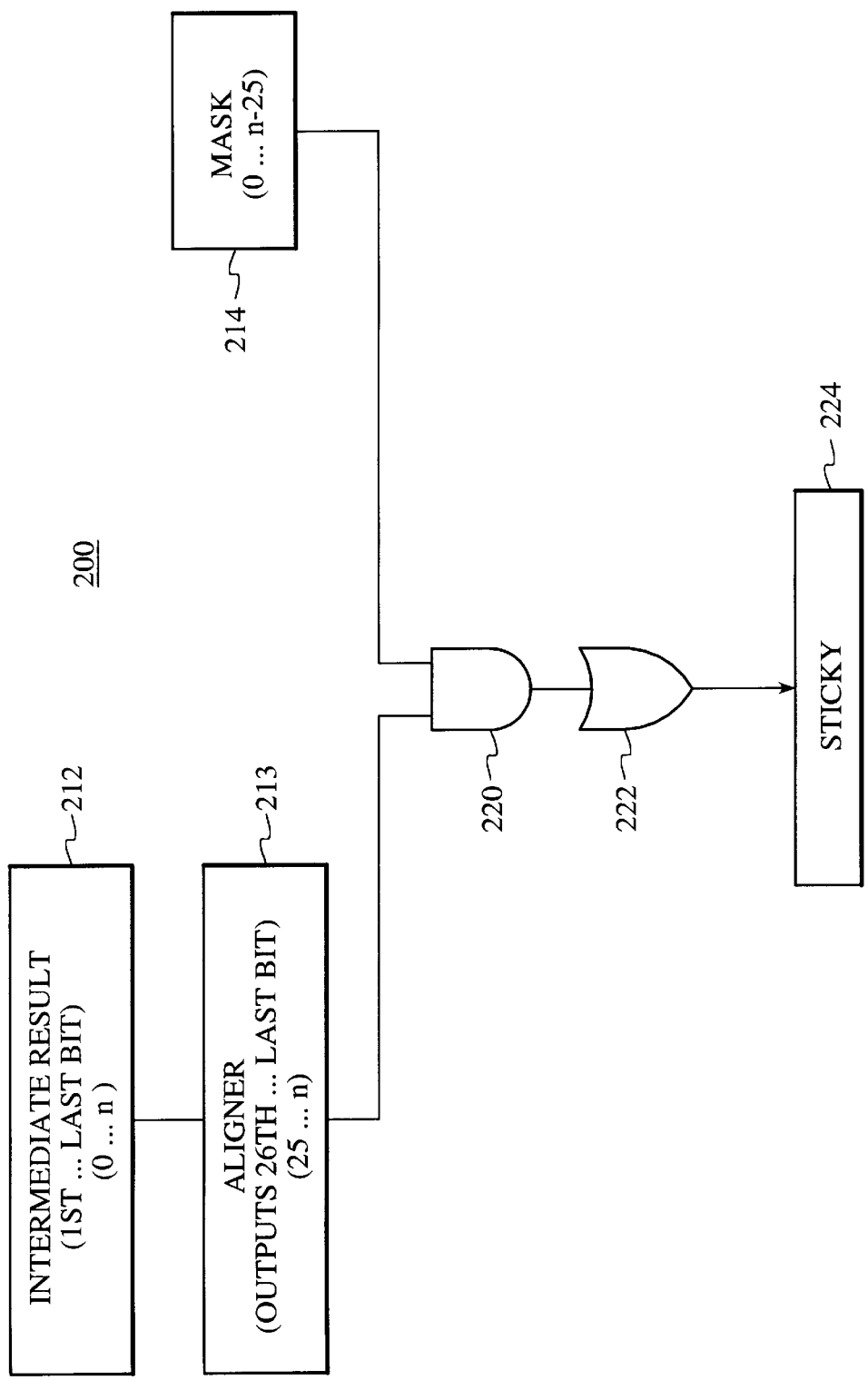

METHOD AND SYSTEM FOR FAST DETERMINATION OF STICKY AND GUARD BITS

FIELD OF THE INVENTION

The present invention relates to a method and system for floating point calculations and more particularly to a method and system for quickly determining sticky bits and/or a function of the guard bit.

BACKGROUND OF THE INVENTION

In order to implement mathematical operations on computers, floating point units are often used. One of ordinary skill in the art realizes that the floating point representation of a number includes a mantissa and an exponent. In addition, one of ordinary skill in the art understands how floating point calculations are generally performed.

Conventional floating point units first determine an intermediate result, the resultant of the floating point calculation performed. The intermediate result is then typically normalized and rounded to ensure that the final result is in the correct format. In the context of this application, intermediate result refers to the unnormalized, unrounded result of the floating point calculation.

Normalization ensures that the leading digit of the mantissa of the final result is not a zero. Typical normalizers accomplish this function by detecting any leading zeroes and shifting the mantissa of the intermediate result left so that the most significant digit is a one. The exponent is adjusted to account for any left shifting the mantissa. Rounding takes account of lower significant bits in the resultant, such as by rounding down. For example, single precision numbers typically utilize mantissas having twenty-four (24) significant bits. However, a typical resultant of, for example, an add operation of two single precision floating point numbers may contain more than 24 bits. The final resultant will have only twenty-four (24) significant bits, with the remaining bits being accounted for in how the normalized intermediate result is rounded to produce the final result, and being used to indicate an exact or inexact final result.

In order to perform rounding and indicate the exactness of the final result, one well known floating point standard, IEEE (Institute for Electrical and Electronic Engineers, Inc.) Binary Floating-point Standard 754 requires the use of sticky and guard bits. The guard bit is defined as the bit that is one position less significant than the least significant bit of the normalized, unrounded mantissa of the intermediate result For example, the guard bit for a typical single precision floating point numbers would be the twenty-fifth bit of the normalized, unrounded mantissa of the intermediate result. The sticky bit is the logical OR of bits of the mantissa of the normalized, unrounded intermediate result having less significance than the guard bit. In the example above, a typical sticky bit would be the logical or of the twenty-sixth through the last bit of the mantissa of a single precision normalized, unrounded intermediate result.

Conventional floating point units complying with IEEE Binary Floating-point Standard 754 calculate the guard and sticky bits after normalization. Because the sticky and guard bits are calculated only after normalization is accomplished, there is a significant delay in completing the rounding process. Because the sticky bit is the logical OR defined above, computation of the sticky bit requires a large logical OR-tree. Consequently, another delay in completing the rounding process is introduced. This delay in accomplishing rounding can be prohibitive in fast circuitry, where the cycle time of the processor is small.

Accordingly, what is needed is a system and method for quickly determining the sticky or guard bits. The present invention addresses such a need.

SUMMARY OF THE INVENTION

The present invention provides a method and system for fast calculation of the sticky bit and a function of the guard bit. The first aspect of the method and system provides for fast calculation of a sticky bit. This aspect comprises means for providing an intermediate result of a floating point mathematical operation involving at least a first operand and a second operand. The first aspect also comprise means for providing a mask indicating a position of a leading one in a mantissa of the intermediate result. Coupled to the intermediate result providing means are means for aligning the first bit of the mask to an (n+2)nd bit of the intermediate result In this aspect, n is equal to the number of bits in a mantissa of the first or second operand. Means for providing an output are coupled to the aligning means and intermediate result providing means. Thus, the first aspect of the method and system allows the sticky bit to be calculated substantially simultaneously with normalization.

The second aspect of the method and system provides a fast calculation of a function of the guard bit. The second aspect comprises means for providing an intermediate result of a floating point mathematical operation involving at least a first operand and a second operand. The second aspect also comprises means for providing a mask indicating a position of a leading one in a mantissa of the intermediate result. Coupled to the intermediate result providing means are means for aligning a first bit of the mask to an (n+1)st bit of the intermediate result, where n is the number of bits in a mantissa of the first or second operand. Means for providing an output are coupled to the aligning means and intermediate result providing means. The output further comprises a function of the guard bit. Therefore, the second aspect of the method and system allows a function of the guard bit to be calculated substantially simultaneously with normalization.

According to the system and method disclosed herein, the present invention provides a fast determination of the sticky bit and a function of the guard bit, thereby eliminating delays due to post-normalization calculations of the sticky bit and functions of the guard bit. In addition, an embodiment of the present invention allows for fast notification of whether the final result is exact. Consequently, overall system performance is increased.

BRIEF DESCRIPTION OF THE DRAWINGS

FIG. 3 is a block diagram of one embodiment of a system for determining the sticky bit in accordance with the present invention.

DESCRIPTION OF THE INVENTION

The present invention relates to an improvement in mathematical calculations by a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments.. Thus, the present invention is not intended to be limited to the embodiment shown but is to be accorded the widest scope consistent with the principles and features described herein.

Figure 1:
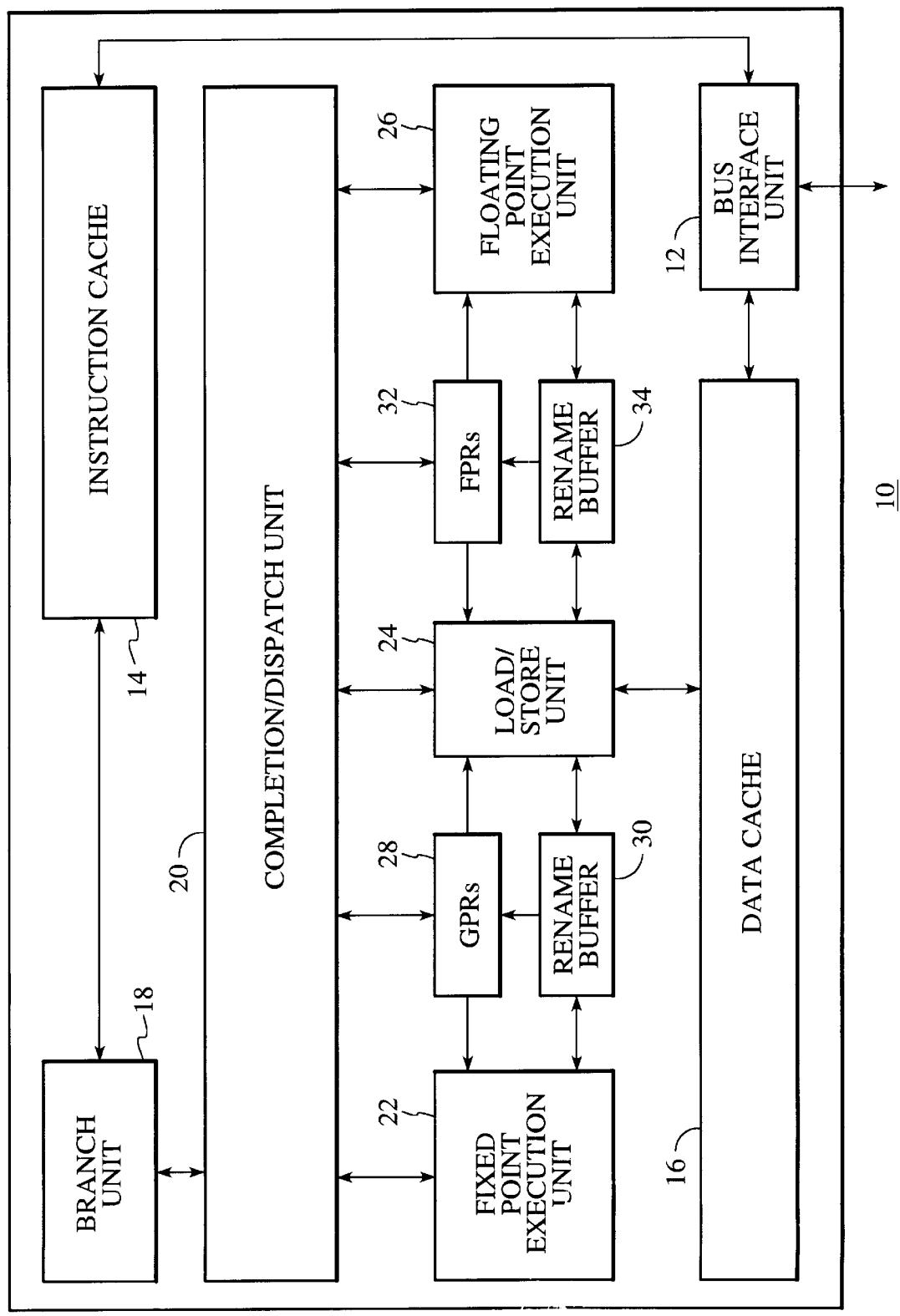
FIG. 1 depicts a block diagram of a conventional data processor.

FIG. 1 depicts a block diagram of a conventional data processor 10. Data processor 10 manipulates certain data in scientific notation. A bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a branch unit 18 and to a completion/dispatch unit 20. Completion/dispatch unit 20 forwards individual instructions to an appropriate execution unit. Data processor 10 has a fixed point execution unit 22, a load/store execution unit 24, and a floating point execution unit 26. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

Typical floating point execution unit 26 performs a calculation, then normalizes and rounds the intermediate result of the calculation. In the context of this application, the term "intermediate result" refers to the unnormalized, unrounded result of the floating point calculation. One of ordinary skill in the art understands the processes used to normalize and round the intermediate result. Thus, the final result has no leading zeroes and, if not exact, is rounded according to the criteria of the particular floating point unit.

In order to perform rounding, typical floating point units employ a standard. One such standard is the IEEE Binary Floating-point Standard 754 ("IEEE Standard 754"). One of ordinary skill in the art knows the requirements of the IEEE Standard 754. Two requirements of the IEEE Standard 754 used to perform the rounding operation are a guard bit and a sticky bit. The guard bit is the next least significant bit after the final bit of the mantissa of the normalized, unrounded intermediate result. The sticky bit is the logical OR of the bits less significant than the guard bit.

Typical floating point units complying with IEEE Standard 754 calculate the guard and sticky bits after normalization. Consequently, a delay is introduced into the rounding process due to the fact that the guard and sticky bits are calculated after normalization. Because the sticky bit is the logical OR defined above, computation of the sticky bit requires a large logical OR-tree. This computation introduces an additional delay to the rounding. Although the calculations of the guard and sticky bits function adequately for slower circuitry, those with ordinary skill in the art will realize that there is a significant delay in rounding due to these calculations. This delay can be prohibitive in fast circuitry, where the cycle time of the processor is small.

The present invention provides for a method and system for a fast calculation of the sticky bit and a function of the guard bit. In particular, the present invention computes the function of the guard bit and the sticky bit concurrently with the normalization process. The present invention will be described in terms of a system for floating point unit complying with IEEE Standard 754 specifications and single precision (twenty-four bit mantissa) floating point numbers. However, one of ordinary skill in the art will readily recognize that this method and system will operate effectively for units performing calculations on other types of numbers, such as double precision numbers, and other types of standards.

The method and system utilize masks which are generated in order to normalize the intermediate result. The operation of these masks is more fully described in U.S. patent application Ser. No. 08/161,361, filed on Dec. 6, 1993, entitled "Result Normalize and Method of Operation", assigned to the assignee of the present application. The mask generated to normalize the intermediate result indicates the position of the leading one of the intermediate result. One embodiment of such a mask comprises zeroes in places corresponding to the leading zeroes of the intermediate result and ones corresponding to the leading one and all less significant bits of the intermediate result For example, an intermediate result of the form 000000010101 . . . 1101101 would have a mask of the form 000000011111 . . . 1111111.

Because the present invention uses masks and the intermediate result in lieu of the normalized intermediate result, the invention is capable of calculating a function of the guard bit and the sticky bit concurrently with normalization. In addition, the masks are provided relatively quickly in relation to the time required to complete normalization. Finally, the masks also provided relatively early in the normalization process. Thus, utilizing the masks in the computation of the sticky bit and a function of the guard bit does not introduce a significant delay. Consequently, the sticky bit and a function of the guard bit can be calculated substantially simultaneously with normalization.

The method and system align the mask to the position of the guard bit and those bits which must be logically ORed in order to determine the sticky bit. In one embodiment, in order to calculate a function of the guard bit, the method and system align the first bit of the mask to the (n+1)st bit of the unnormalized intermediate result, where n is the number of bits of the mantissa of an operand. For example, in an embodiment of the method and system for single precision floating point numbers, the method and system align the mask to the twenty-fifth (25th) bit of the intermediate result in order to mark the position of the guard bit. An example of an intermediate result and mask used to mark the position of the guard bit are:

00000001010110101110110110101110101 . . . 101 and
00000001111 . . . 111, respectively.

Similarly, the method and system align the first bit of the mask to the (n+2)nd bit of the intermediate result when determining the sticky bit. As discussed above, n is the number of digits in the mantissa of an operand. For example, an embodiment of the method and system used with single precision floating point numbers would align the first bit of the mask right with the twenty-sixth (26th) bit in order to mark the bits for use in calculating the sticky bit. Thus, an example of an intermediate result and mask used to mark the position of the bits used for calculate the sticky bit are:

00000001010110101110110110101111101010 . . . 01 and
00000001111 . . . 11, respectively.

Figure 2:
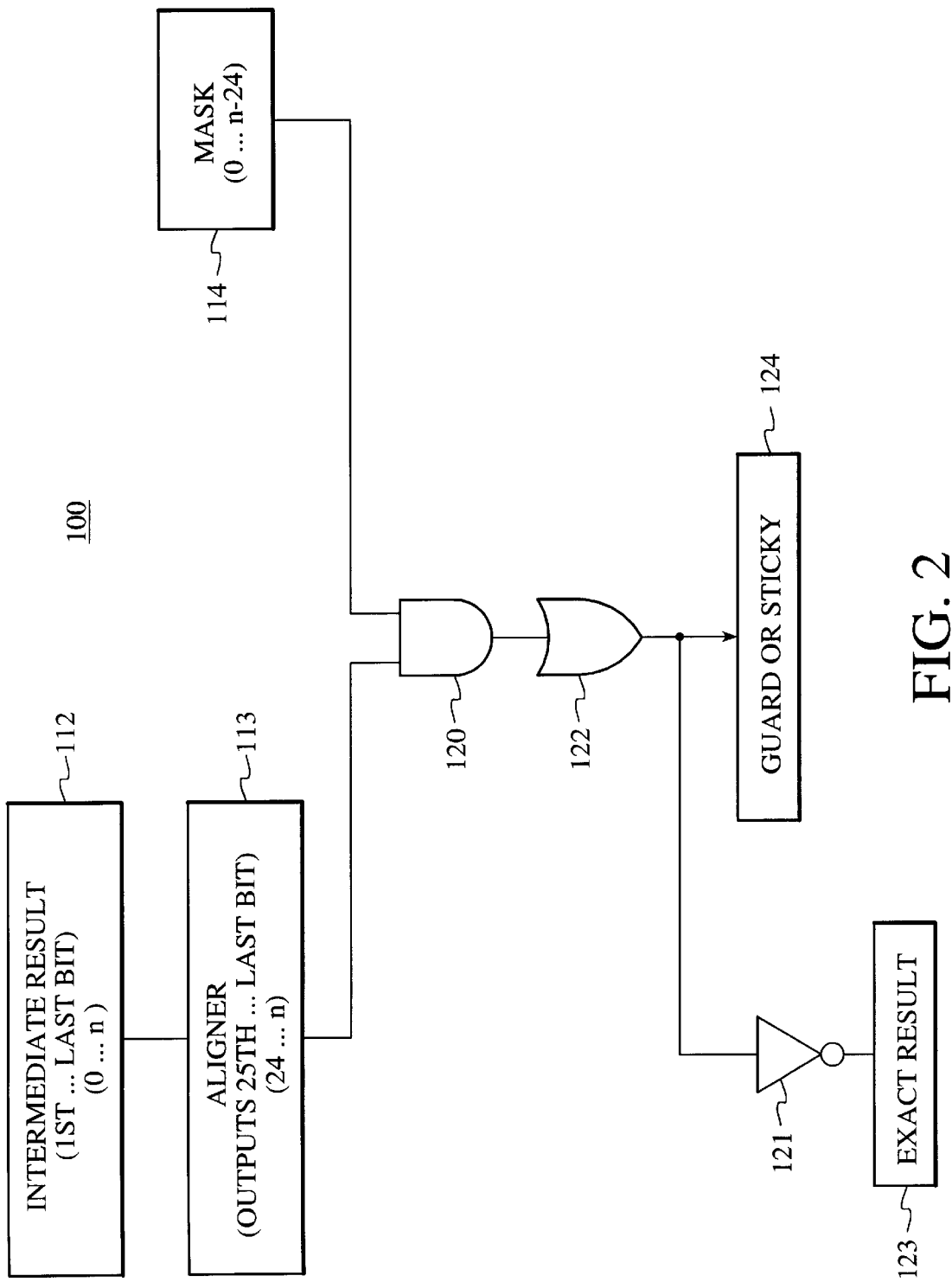
FIG. 2 is a block diagram of one embodiment of a system for determining a function of the guard bit in accordance with the present invention.

To more particularly illustrate the method and system in accordance with the present invention, refer now to FIG. 2 depicting a block diagram of one embodiment of a system 100 for determining a function of the guard bit. In the embodiment in FIG. 2 the function of the guard bit is the guard bit logically ORed with the sticky bit. The system 100 is shown using single precision operands. However, nothing prevents the use of double precision or both single and double precision operands. In addition, although the FIG. 2 depicts an embodiment for determining the guard bit logically ORed with the sticky bit, nothing prevents the method and system from computing a different function of the guard bit.

The system 100 has as inputs the intermediate result 112 of a floating point calculation and the mask 114. The intermediate result 112, is aligned to the mask 114 by using aligner 113. Aligner 113 aligns the first bit of the mask to the (n+1)st bit of the intermediate result, where n equals the number of bits in a mantissa of an operand on which the floating point calculation was performed. In a preferred embodiment, aligner 113 accomplishes this task simply by taking only the twenty-fifth through last bits of the intermediate result 112 as inputs, for example by wiring only the twenty-fifth through last bits of the intermediate result 112 to AND gate 120. Thus, alignment of the first bit of the mask with the twenty-fifth bit of the intermediate result is achieved with minimal delay.

The twenty-fifth through last bits of intermediate result 112 output by aligner 113 and the mask 114 are then input to AND gate 120. In the system 100, the AND gate 120 carries out a bit-by-bit AND of the twenty-fifth through last bit of the intermediate result 112 with the appropriate number of bits of the mask 114. In the embodiment shown, the AND gate 120 carries out a bit-by-bit AND of the twenty-fifth through last bit of the intermediate result 112 with an equal number of most significant bits of the mask 114. This provides a gated result. The bits of the gated result are then logically ORed together by OR gate 122. In the embodiment shown, it is preferable to quickly calculate the guard bit logically ORed with the sticky bit to determine the exactness of the final result. Where output 124 is one, the result is inexact.

In an embodiment of the system, notification can also be provided as to whether the final result is exact. Because the system 100 provides fast calculation of the output 124, the system 100 may also provide fast notification of whether the final result is exact. Notification of whether the result is exact is shown in FIG. 2 as second output 123. Where the guard bit logically ORed with the sticky bit is zero, the result is exact. Because gate 121 inverts the guard bit logically ORed with the sticky bit, where the second output 123 is one, the result is exact. Although FIG. 2 displays an embodiment providing notification of both an exact result and an inexact result where outputs 123 and 124, respectively, are one, nothing in the method and system require that both output 123 and output 124 be provided.

FIG. 3 depicts a block diagram of one embodiment of a system 200 for calculating the sticky bit. The inputs to system 200 are the intermediate result 212 and the mask 214. The intermediate result 212 is aligned to the mask 214 by using aligner 213. Aligner 213 aligns the first bit of the mask to the (n+2)nd bit of the intermediate result, where n equals the number of bits in a mantissa of an operand on which the floating point calculation was performed. In a preferred embodiment, aligner 213 accomplishes this task simply by taking only the twenty-sixth through last bits of the intermediate result 212 as inputs, for example by wiring only the twenty-sixth through last bits of the intermediate result 212 to AND gate 220. Thus, alignment of the first bit of the mask with the twenty-sixth bit of the intermediate result is achieved with minimal delay.

The twenty-sixth through last bits of the intermediate result 212 output by the aligner 213 and the mask 214 are then input to AND gate 220. In the system 200, the AND gate 220 carries out a bit-by-bit AND of the (n+2)nd through last bits of the intermediate result 212 with the appropriate number of bits of mask 214. In the embodiment shown, the AND gate 220 carries out a bit-by-bit AND of the twenty-sixth through last bit of the intermediate result 212 with an equal number of most-significant bits of the mask 214. This provides a second gated result The bits of the second gated result are then logically ORed together by OR gate 222. The result of this operation is the output 224, the sticky bit. If the sticky bit 224 is a zero, all of the bits following the guard bit are zero.

Note that system 100 and system 200 may be combined in order to use common inputs, such as the intermediate result 112 of system 100 in FIG. 2.

Because the systems 100 and 200 use the intermediate result and the mask used for normalization, the operations performed by systems 100 and 200 can be carried on substantially simultaneously with normalization. Consequently, the delays due to post normalization calculations of the sticky bit and the function of the guard bit are diminished.

A method and system has been disclosed for a fast calculation of the sticky bit and a function of the guard bit. Because the method and system reduce delays in the calculation of the sticky bit and the function of the guard bit, the method and system allow for the computation of the sticky bit and the function of the guard bit in fast circuitry.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for fast calculation of a sticky bit comprising:
    means for providing an intermediate result of a floating point mathematical operation involving at least a first operand and a second operand;
    means for providing a mask indicating a position of a leading one in a mantissa of the intermediate result;
    means coupled to the intermediate result providing means for aligning a first bit of the mask to an (n+2)nd bit in the intermediate result, where n is the number of bits in a mantissa of the first or second operand;
    means coupled to the mask aligning means and the mask providing means for providing an output, the output further comprising a function of the sticky bit;
    wherein the sticky bit is allowed to be calculated substantially simultaneously with normalization.

2. The system of claim 1 wherein the output providing means further comprise:
    means for providing a gated result; and
    means coupled to the gated result providing means for determining the output.

3. The system of claim 2 wherein the gated result providing means further comprise means for providing an AND of the (n+2)nd through last bits of the intermediate result with bits of the mask.

4. The system of claim 3 wherein the output determining means further comprise means for providing an OR of bits of the gated result.

5. The system of claim 4 wherein the output further comprises the sticky bit.

6. A system for fast calculation of a function of a guard bit comprising:

means for providing an intermediate result of a floating point mathematical operation involving at least a first operand and a second operand;

means for providing a mask indicating a position of a leading one in a mantissa of the intermediate result;

means coupled to the intermediate result providing means for aligning a first bit of the mask to an (n+1)st bit in the intermediate result, where n is the number of bits in a mantissa of the first or second operand;

means coupled to the aligning means and the mask providing means for providing an output, the output further comprising the function of the guard bit;

wherein the function of the guard bit is allowed to be calculated substantially simultaneously with normalization.

7. The system of claim 6 wherein the output providing means further comprise:

means for providing a gated result; and means coupled to the gated result providing means for determining the output.

8. The system of claim 7 wherein the gated result providing means further comprise means for providing an AND of the (n+1)st through last bit of the intermediate result with bits of the mask.

9. The system of claim 8 wherein the output determining means further comprise means for providing an OR of bits of the gated result.

10. The system of claim 9 wherein the output further comprises a guard bit logically ORed with a sticky bit.

11. The system of claim 10 further comprising means coupled to the output providing means for providing notification of whether a final result of the floating point mathematical operation is exact or inexact.

12. A system for fast calculation of a sticky bit and a function of a guard bit comprising:

means for providing an intermediate result of a floating point mathematical operation involving at least a first operand and a second operand;

means for providing a mask indicating a position of a leading one in a mantissa of the intermediate result;

first means coupled to the intermediate result providing means for aligning a first bit of the mask to an (n+1)st bit in the intermediate result, where n is the number of bits in a mantissa of the first or second operand;

second means coupled to the intermediate result providing means for aligning a first bit of the mask to an (n+2)nd bit in the intermediate result;

means coupled to the first aligning means and the mask providing means for providing a first output, the first output further comprising a function of the guard bit; and means coupled to the second aligning means and the mask providing means for providing a second output, the second output further comprising a function of the sticky bit;

wherein the sticky bit and the function of the guard bit is allowed to be calculated substantially simultaneously with normalization.

13. The system of claim 12 wherein the first output providing means further comprise means for providing a first gated result and means coupled to the first gated result providing means for determining the first output;

and wherein the second output providing means further comprise means for providing a second gated result and means coupled to the second gated result providing means for determining the second output.

14. The system of claim 13 wherein the first gated result providing means further comprise means for providing an AND of the (n+1)st through last bits of the intermediate result with bits of the mask.

15. The system of claim 14 wherein the second gated result providing means further comprise means for providing an AND of (n+2)nd through last bits of the intermediate result with bits of the mask.

16. The system of claim 15 wherein the first output determining means further comprise means for providing an OR of bits of the first gated result.

17. The system of claim 16 wherein the second output determining means further comprise means for providing an OR of bits of the second gated result.

18. The system of claim 17 wherein the first output further comprises the guard bit logically ORed with the sticky bit.

19. The system of claim 18 wherein the second output further comprises the sticky bit.

20. The system of claim 19 further comprising means coupled to the means for providing a first output for providing notification of whether a final result of the floating point mathematical operation is exact.

21. A method for fast calculation of a sticky bit comprising the steps of:

(a) providing an intermediate result of a floating point mathematical operation involving at least a first operand and a second operand;

(b) providing a mask indicating a position of a leading one in a mantissa of the intermediate result;

(c) aligning a first bit of the mask with an (n+2)nd bit of the intermediate result, where n further comprises the number of bits in a mantissa of the first or second operand; and (d) providing an output, the output further comprising the sticky bit;

wherein the sticky bit is allowed to be calculated substantially simultaneously with normalization.

22. The method of claim 21 wherein the output providing step further comprises the steps of:

(d1) providing a gated result; and (d2) determining the output.

23. The method of claim 22 wherein the gated result providing step further comprises the step of providing an AND of bits of the (n+2)nd through last bits of the intermediate result with bits of the mask.

24. The method of claim 23 wherein the output determining step further comprises the step of providing an OR of bits of the gated result.

25. The method of claim 24 wherein the output further comprises the sticky bit.

26. A method for calculating a function of a guard bit comprising the steps of:

(a) providing an intermediate result of a floating point mathematical operation involving at least a first operand and a second operand;

(b) providing a mask indicating a position of a leading one in a mantissa of the intermediate result;

(c) aligning a first bit of the mask with the (n+1)st bit of the intermediate result, where n is the number of bits in a mantissa of the first or second operand; and (d) providing an output, the output further comprising the function of the guard bit;

wherein the function of the guard bit is allowed to be calculated substantially simultaneously with normalization.

27. The method of claim 26 wherein output providing step (d) further comprises:

(d1) providing a gated result; and (d2) determining the output.

28. The method of claim 27 wherein gated result providing step (d1) further comprises providing an AND of the (n+1)st through last bits of the intermediate result with bits of the mask.

29. The method of claim 28 wherein output determining step (d2) further comprises providing an OR of bits of the gated result.

30. The method of claim 29 wherein the output further comprises a guard bit logically ORed with a sticky bit.

31. A method for fast calculation of a sticky bit and a function of a guard bit comprising the steps of:

(a) providing an intermediate result of a floating point mathematical operation involving at least a first operand and a second operand;

(b) providing a mask indicating a position of a leading one in a mantissa of the intermediate result;

(c) providing a first aligning step, the first aligning step further comprising the step of aligning an (n+1)st bit of the intermediate result with a first bit of the mask, where n further comprises a number of bits in a mantissa of the first or second operand;

(d) providing a second aligning step, the second aligning step further comprising the step of aligning an (n+2)nd bit of the intermediate result with a first bit of the mask;

(e) providing a first output, the first output further comprising the function of the guard bit; and (f) providing a second output, the second output further comprising the sticky bit;

wherein the function of the guard bit and sticky bit is allowed to be calculated substantially simultaneously with normalization.

32. The method of claim 31 wherein the first output providing step (e) further comprises the steps of:

(e1) providing a first gated result, and (e2) determining the first output;

and wherein second output providing step (f) further comprises the steps of:

(f1) providing a second gated result, and (f2) determining the second output.

33. The method of claim 32 wherein first gated result providing step (e1) further comprises providing an AND of bits of the (n+1)st through last bits of the intermediate result with bits of the mask.

34. The method of claim 33 wherein second gated result providing step (f1) further comprises providing an AND of an (n+2)nd through last bits of the intermediate result with bits of the mask.

35. The method of claim 34 wherein first output determining step (e2) further comprises the step of providing an OR of bits of the first gated result.

36. The method of claim 35 wherein second output determining step (f2) further comprises the step of providing an OR of bits of the second gated result.

37. The method of claim 36 wherein the first output further comprises the guard bit logically ORed with the sticky bit.

38. The method of claim 37 wherein the second output further comprises the sticky bit.

39. The method of claim 38 further comprising the step of:

(h) providing notification of whether a final result of the floating point mathematical operation is exact.

* * * * *